(12) United States Patent
Winn et al.

(10) Patent No.: US 7,840,059 B2
(45) Date of Patent: Nov. 23, 2010

(54) OBJECT RECOGNITION USING TEXTONS AND SHAPE FILTERS

(75) Inventors: John Winn, Cambridge (GB); Carsten Rother, Cambridge (GB); Antonio Criminisi, Cambridge (GB); Jamie Shotton, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/534,019

(22) Filed: Sep. 21, 2006

(65) Prior Publication Data

US 2008/0075361 A1 Mar. 27, 2008

(51) Int. Cl.
*G06K 9/62* (2006.01)
(52) U.S. Cl. .................. 382/155; 382/180; 382/224; 382/190
(58) Field of Classification Search .................. 382/118, 382/101, 224, 181
See application file for complete search history.

(56) References Cited

U.S. PATENT DOCUMENTS

2006/0098871 A1* 5/2006 Szummer .................... 382/173
2007/0223790 A1* 9/2007 Xiao et al. .................. 382/118

OTHER PUBLICATIONS

Kumar e et al: "Discriminative random field: a discriminative framework for contextual interaction in classification", Ninth IEEE International Conference on Computer Vision (ICCV'03)—vol. 2, 2003.*
He et al: "Multiscale conditional ramdom fields for image labeling", in Proc. CVPR'04, IEEE, 2004.*
Berg, A.C. et al., "Shape Matching and Object Recognition using Low Distortion Correspondences", In: CVPR. (2005), 8 pages.
Borenstein, E. et al., "Combining Top-down and Bottom-up Segmentation", In: Proceedings IEEE workshop on Perceptual Organization in Computer Vision, CVPR 2004, (2004), 8 pages.
Duygulu, P. et al., "Object Recognition as Machine Translation: Learning a Lexicon for a Fixed Image Vocabulary",ECCV (2002), 15 pages.
Fergus, R. et al. "Object Class Recognition by Unsupervised Scale-Invariant Learning", In: CVPR'03. vol. II. (2003) pp. 264-271.

(Continued)

*Primary Examiner*—Samir A. Ahmed
*Assistant Examiner*—Ruiping Li
(74) *Attorney, Agent, or Firm*—Lee & Hayes, PLLC (57) ABSTRACT

Given an image of structured and/or unstructured objects we automatically partition it into semantically meaningful areas each labeled with a specific object class. We use a novel type of feature which we refer to as a shape filter. Shape filters enable us to capture some or all of shape, texture and appearance context information. A shape filter comprises one or more regions of arbitrary shape, size and position within a bounding area of an image, paired with a specified texton. A texton comprises information describing the texture of a patch of surface of an object. In a training process we select a sub-set of possible shape filters and incorporate those into a conditional random field model of object classes. That model is then used for object detection and recognition.

21 Claims, 7 Drawing Sheets

OTHER PUBLICATIONS

He, X. et al. "Multiscale Conditional Random Fields for Image Labeling". Proc. Of IEEE CVPR (2004), 8 pages.

Konishi, S. et al., "Statistical cues for Domain Specific Image Segmentation with Performance Analysis", In: Proc. CVPR'2000 (2000), 13 pages.

Kumar, S. et al., "Discriminative Fields for Modeling Spatial Dependencies in Natural Images", In: NIPS. (2004), 8 pages.

Kumar, S. et al. "Man-Made Structure Detection in Natural Images using a Causal Multiscale Random Field", IEEE Int. Conf. on Computer Vision and Pattern Recognition (CVPR) (2003), 8 pages.

Kumar, P. et al., "OBJ CUT", Proc. of IEEE CVPR, (2005), 61 pages.

Leibe, B. et al., "Interleaved Object Categorization and Segmentation", In: BMVC'03, vol. II. (2003) 264-271, 10 pages.

Tu, Z. et al., "Image Parsing: Unifying Segmentation, Detection, and Recognition", In: CVPR, (2003).

Winn, J. et al., "LOCUS: Learning Object Classed with Unsupervised Segmentation", Proc. of IEEE ICCV, (2005), 8 pages.

Winn, J. et al., "Object Categorization by Learned Universal Visual Dictionary", IEEE Int. Conf. of Computer Vision (2005), 8 pages.

\* cited by examiner

OBJECT RECOGNITION USING TEXTONS AND SHAPE FILTERS

TECHNICAL FIELD

This description relates generally to image processing and more specifically to object detection and recognition.

BACKGROUND

Object detection and recognition are difficult problems in the field of computer vision. Object detection involves determining the presence of one or more objects in an image of a scene. Image segmentation comprises identifying all image elements that are part of the same object in an image. Object recognition comprises assigning semantic labels to the detected objects. For example, to determine a class of objects that the object belongs to such as cars, people or buildings. Object recognition can also comprise assigning class instance labels to detected objects. For example, determining that a detected object is of a particular type of car. Object recognition may also be referred to as semantic segmentation.

There is a need to provide simple, accurate, fast and computationally inexpensive methods of object detection and recognition for many applications. For example, given a photograph or other image it is required to automatically partition it into semantically meaningful areas each labeled with a specific object class. In addition, there is a need to cope with both structured object classes such as people, cars, buildings and unstructured object classes such as sky, grass or water. When dealing with large collections of images and/or large numbers of object classes, efficiency of computation is a particular requirement.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Given an image of structured and/or unstructured objects we automatically partition that image into semantically meaningful areas each labeled with a specific object class. We use a novel type of feature which we refer to as a shape filter. Shape filters enable us to capture some or all of shape, texture and appearance context information. A shape filter comprises one or more regions of arbitrary shape, size and position within a bounding area of an image, paired with a specified texton. A texton comprises information describing the texture of a patch of surface of an object. In a training process we select a sub set of possible shape filters and incorporate those into a conditional random field model of object classes. That model is then used for object detection and recognition.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 2a is an example input image;

FIG. 2b is an example of a texton map formed from the input image of FIG. 2a;

FIG. 2c is an example of a feature pair;

FIG. 2d shows part of the texton map of FIG. 2b with three superimposed rectangles;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an object detection and recognition system, the system described is provided as an example and not a limitation. As those skilled in the art will appreciate, the present examples are suitable for application in a variety of different types of image processing systems. For example, it is not essential to use photographs or still digital images, video images or other types of images may be used such as medical images, infra-red images, x-ray images or any other suitable type of image.

The term "image element" is used to refer to a pixel, or a plurality of pixels such as a cluster of pixels or block of neighboring pixels.

Figure 1:
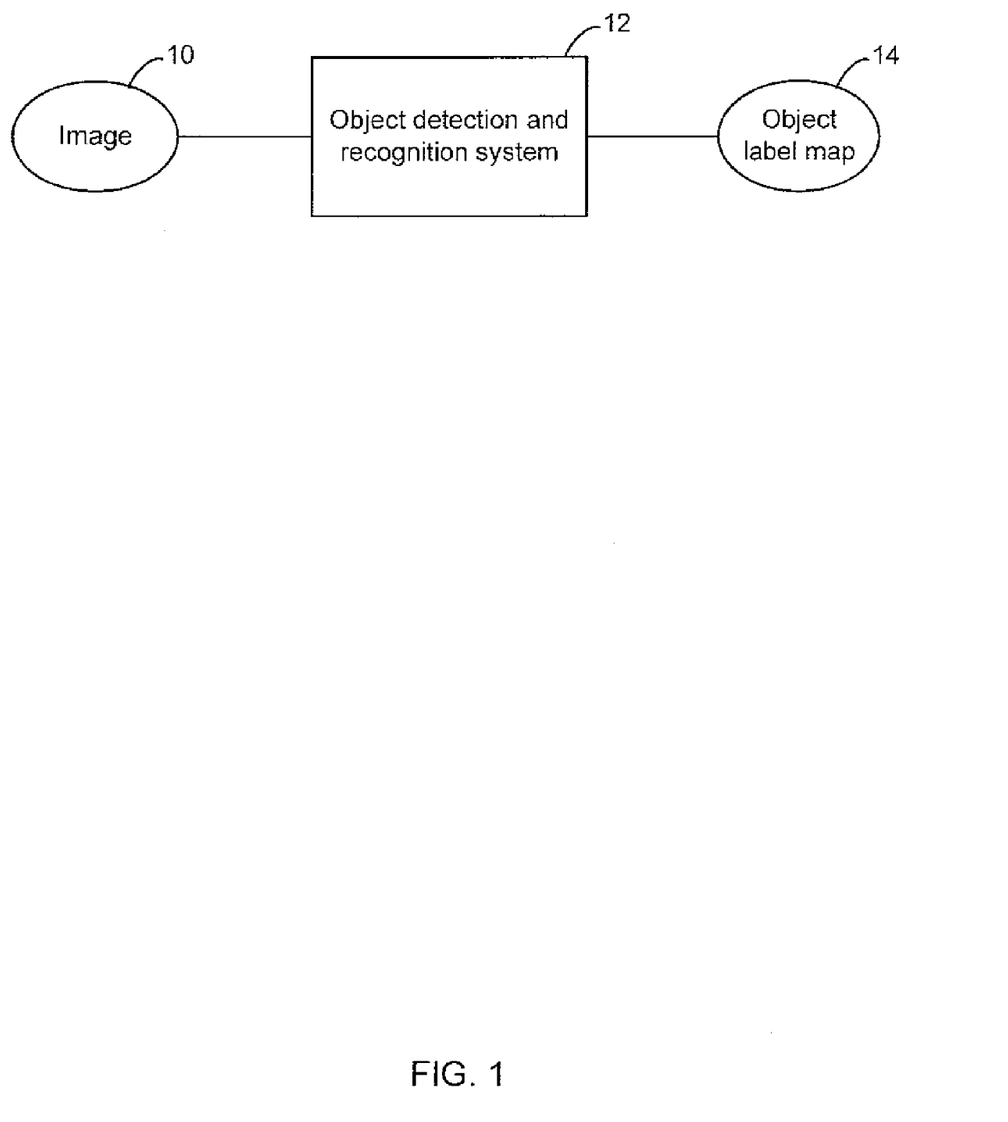
FIG. 1 is a high level schematic diagram of an object detection and recognition system showing input and output.

FIG. 1 is a high level schematic diagram of an object detection and recognition system 12 which is provided using any suitable type of processor such as a computer having software as known in the art suitable for enabling software for implementing the invention to be executed. The object detection and recognition system comprises an input arranged to receive images 10 within which it is required to detect and recognize objects. The input may be of any suitable type such as an image capture device of any suitable type such as a camera, medical imaging device, video camera or the like. The input may also be any suitable means for receiving a previously obtained image such as a communications link, disk drive, USB connection or other suitable input means.

The input image is of one or more objects to be detected and recognized. No specific requirements for lighting conditions, camera viewpoint, scene geometry, object pose or articulation are required for the input image or for training images used during a training phase discussed in more detail below. In addition, the image may be of structured and/or unstructured objects. For example, sky is an example of an unstructured object and a person or car is an example of a structured object.

The object detection and recognition system 12 also has an output arranged to provide an object label map 14 associated with an input image. The output is of any suitable type such as a graphical user interface, a file or any other suitable output. The object label map comprises, for each image element, a label indicating an object class to which that image element belongs. For example, the image element may be a pixel or group of pixels and the object class may be for example, building, grass, tree, cow, sheep, sky, aeroplane, water, face, car, bike, flower, sign, bird, book, chair, road, cat, dog, body, boat. Any suitable number of object classes may be used and in one example discussed below, 21 object classes are used.

We devise a novel type of feature for use in object detection and recognition and we refer to this type of feature herein as a shape filter. Shape filters enable us to capture some or all of shape, texture and appearance context information. An example of such context information might be that "cow" pixels tend to be surrounded by "grass" pixels. Another example of such context information might be that if a feature associated with the neck of a cow is observed on the left hand side, then features associated with cow legs are expected on the right hand side.

Figure 7:
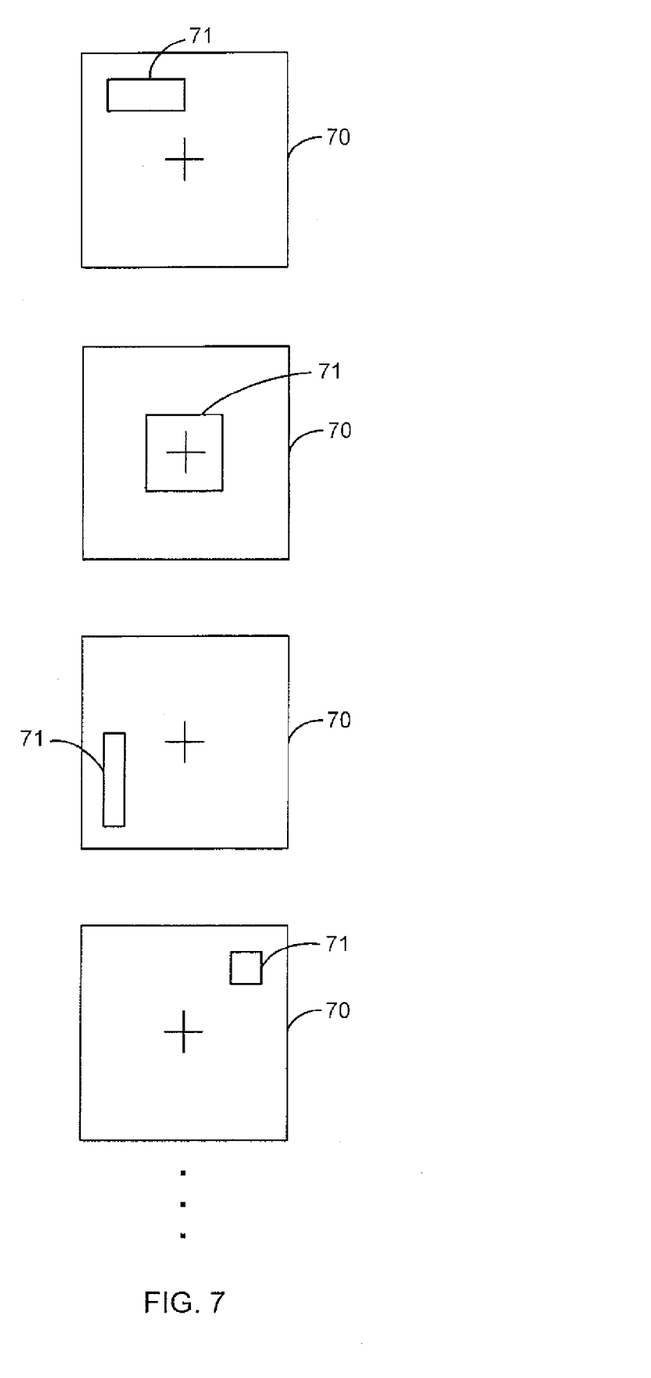
FIG. 7 is a schematic diagram of example bounding areas with rectangular regions, or masks, shown in each.

A shape filter comprises one or more regions of arbitrary shape, size and position within a bounding area of an image, used together with a specified texton (see below for an explanation of textons). In one embodiment of the invention the regions are rectangles whose four corners are chosen at random (such that a square is an example of a rectangle) and the bounding area is a box covering about half the image area. However, this is not essential, the regions may be of any suitable shape and the bounding area may be of other sizes relative to the image. For example, the bounding area may be movable within the image and have an area about ¼ to ¾ of the image area. FIG. 7 shows a bounding area 70 the center of which is marked by a cross and with random rectangular regions 71 (also referred to herein as masks) shown in each bounding area. A plurality of such rectangular regions are chosen using a pseudo-random process during formation of a shape filter as described in more detail below.

Each shape filter has an associated texton. For example, for a given set of regions (e.g. rectangle masks) in a bounding area and a texton we compute feature responses. Textons are known in the art and are described in detail in for example, Leung, T. and Malik, J. "Representing and recognizing the visual appearance of materials using three-dimensional textons" IJCV 43 2001 29-44. A texton can be thought of as information describing the texture of a patch of surface of an object. The information can comprise geometric and photometric properties of the patch. For example, a texton may comprise information describing a patch of surface having a ridge, groove, spot, stripe or combination thereof. Given a relatively small texton vocabulary, this can be used to characterize images of any material as known in the art from the Leung and Malik paper mentioned above.

In one embodiment we learn a vocabulary or dictionary of textons from a set of training images that are also used during other training aspects of processes described herein. However, it is also possible to use a pre-specified set of textons formed from independent information.

Any suitable method for learning the dictionary or vocabulary of textons can be used. For example, by convolving a multi dimensional filter bank with the set of training images and running a clustering algorithm on the filter responses. Any suitable filter bank can be used such as the 17-dimensional filter bank described in the work, "Categorization by learned universal visual dictionary" Winn, J., Criminisi, A., Minkca, T. rit. Conf. on Computer Vision 2005. That filter bank comprises scaled Gaussians, x and y derivatives of Gaussians, and Laplacians of Caussians. The Caussians are applied to three color channels, while the remaining filters only to luminance. In an example, the perceptually uniform CIELab color space is used. However, any suitable color space can be used. Any suitable clustering algorithm can be used such as K-means clustering using Mahalanobis distance, Mean Shift or agglomerative clustering.

Figure 2:
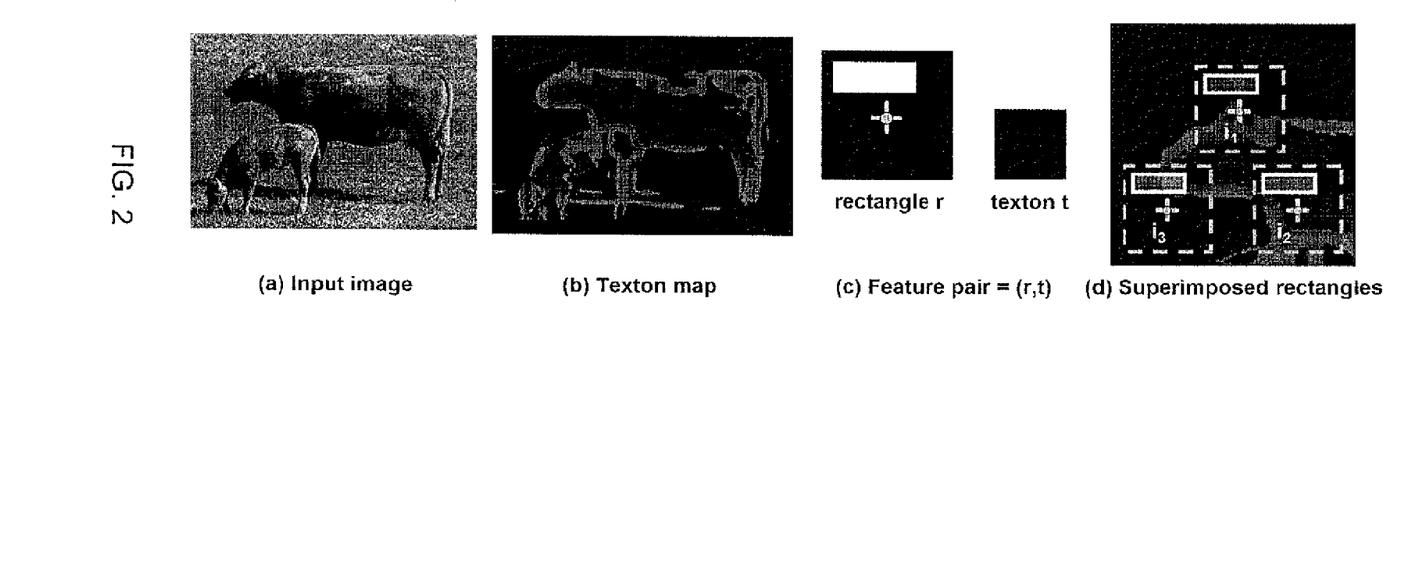

As mentioned above, for a given feature pair comprising a set of regions (e.g. rectangle masks) in a bounding area and a texton we compute feature responses. This is now described with reference to FIG. 2. FIG. 2a shows an example input image which in this case is a photograph of a cow and a calf standing on grass. A texton map is formed from the input image and FIG. 2b shows a texton map computed from FIG. 2a. The texton map, comprises, for each image element a label indicating which texton from the dictionary of textons most appropriately describes that image element. For example, each image element is assigned to its nearest cluster center (for example, using Mahalanobis distance). Please note that the images of FIG. 2 are presented here in grey scale. The different grey values in FIG. 2b and 2d are intended to represent different texton indices.

FIG. 2c shows a particular feature pair comprising a bounding region (black rectangle) comprising a rectangle mask r (white rectangle inside bounding region) which is offset from the center (indicated by cross) of the bounding region and a texton t which describes grass texture for example. A feature response can be thought of as the number of instances of a particular type of texton under the mask in a particular location. In the example of FIG. 2d a feature response for the feature pair of FIG. 2c is calculated at three positions i1, i2, i3 as illustrated. If A is the area of the mask rectangle r in units of image elements, then the feature response v(i1, r, t) is approximately equal to A because in the position i1 the mask is located fully over grass textons in the texton map. For position i2 the feature response is approximately zero because the mask is located fully over non-grass textons in the texton map. For position i3 the feature response is approximately A/2 because the mask is located over about half grass textons and half non-grass textons in the texton map. For this feature pair (rectangle mask r and grass texton t) our system learns that points such as i1 belonging to "cow" regions tend to produce large feature responses. This enables our system to make use of context information such as "cow pixels tend to be surrounded by grass pixels". In this way feature pairs (also referred to as shape filters) enable us to model appearance-based context.

Following a similar argument as before, our system will learn that "eye pixels" tend to occur near "mouth" or "nose pixels". Therefore, shape filters enable us to model local co-occurrences of object parts within an object region.

The way in which shape filters are used in an object detection and recognition system is now described with reference to FIG. 3. The method of FIG. 3 relates to a test phase; that is operation of the object detection and recognition system on a previously unseen image to produce an object label map. Training phases are also performed as described later with reference to FIGS. 4 and 5. In some embodiments the training and test phases are integral and not completely independent of one another so that it is not necessarily the case that training is always carried out first, independently of use of the system for processing new images.

An input image is received (box 30) such as the input image of FIG. 2a and a texton map is evaluated as already described with reference to FIG. 2b and using a dictionary of textons. A plurality of shape filters are then evaluated (by calculating feature responses as mentioned above) over the texton map (see box 32). For example, thousands of shape filters may be used. These shape filters are determined during a training phase described in more detail below during which a multi-class classifier is formed. During the process of learning the multi class classifier, those shape filters which are useful for discriminating between object classes are learnt.

A belief distribution is then estimated for each image element's belief over a set of object classes which may be recognized (see box 33). For example, there are 21 possible object classes although the method may be extended to larger numbers of object classes. This is achieved using a conditional random field (CRF) model of object classes.

The CRF model is then used to agree an overall object labeling (see box 34) optionally taking into account input from a cross validation process (see below with reference to FIG. 5 box 37) and a process for learning parameters for color potentials in the CRF model during the test phase (see box 35). An inference process is applied to the CRF model to infer the overall object labeling, i.e. the object label map. Any suitable inference process can be used such as an alpha-expansion graph-cut algorithm as described in Boykov, Y., Jolly, M. P. "Interactive graph cuts for optimal boundary and region segmentation of objects in n-d images." Proc. of IEEE ICCV 2001 or a belief propagation algorithm.

Any suitable CRF model may be used and an example is described in detail below. The CRF model defines the conditional probability of object class labels given an image on the basis of a plurality of potentials comprising at least shape-texture potentials and optionally also one or more of color potentials, location potentials and edge potentials. The shape-texture potentials use the novel shape filters we mention above to represent shape, texture and appearance context of object classes. During a learning process, optionally comprising a boosting procedure, we select which shape filters best discriminate between object classes. This is described in more detail below.

In embodiments where color potentials are used in the CRF model, these are arranged to capture the color distribution of the instances of a class in a particular image. Color parameters are learnt separately for each image during the test phase (i.e. use of the system for object detection and recognition on previously unseen images). This is indicated by box 35 of FIG. 3 which feeds back to box 34 of FIG. 3.

As mentioned above, during a training phase a multi-class classifier is learnt. This is now described in more detail with reference to FIG. 4. As mentioned above a set of training images is provided. For example, about 250 training images may be used for about 20 object classes although larger numbers of object classes and training images may be used. For each training image a known object label map is provided in advance, for example, by manually labeling the training images. Pixels may be labeled as void in these known object label maps to cope with pixels that do not belong to an object class for example. Void image elements are ignored for training and testing. For each training image, a texton map is computed as described above.

The training object label map, texton map pairs are provided as input to a learning process of any suitable type which is arranged to identify shape filters which are useful or effective for classifying the image elements into object classes. The learning process effectively produces a multi-class classifier.

In one embodiment the multi-class classifier is learnt using an adapted version of the joint Boosting algorithm described in "Sharing features: efficient boosting procedures for multi-class object detection." Torralba, A., Murphy, K., Freeman, W. Proc. of IEEE CVPR 2004 762-769. This is described in more detail below. However, other methods of learning such a multi-class classifier may be used, such as using support vector machines or decision forests. Decision forests are known in the art and comprise a plurality of decision trees such as the randomized decision trees described in V. Lepetit, P. Lagger, and P. Fua, "Randomised trees for real-time keypoint recognition", CVPR05, pages 775-781, 2005. Support vector machines are also known in the art as described in Vapnik, V. Statistical Learning Theory. Wiley-Interscience, New York, (1998).

Figure 4:
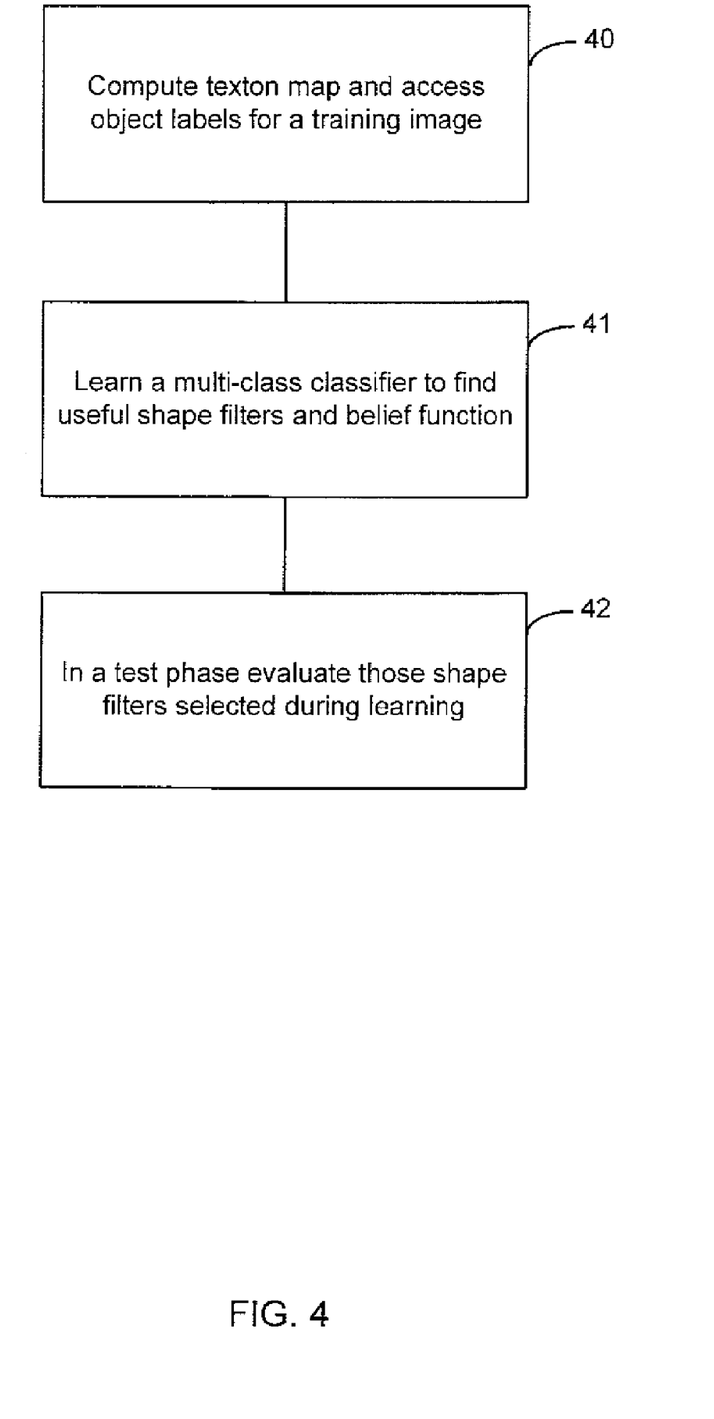
FIG. 4 is a flow diagram of a method during a training phase of an object detection and recognition system.

Those shape filters selected during the process of learning the multi-class classifier are then used during a test phase (see box 42 of FIG. 4).

Figure 3:
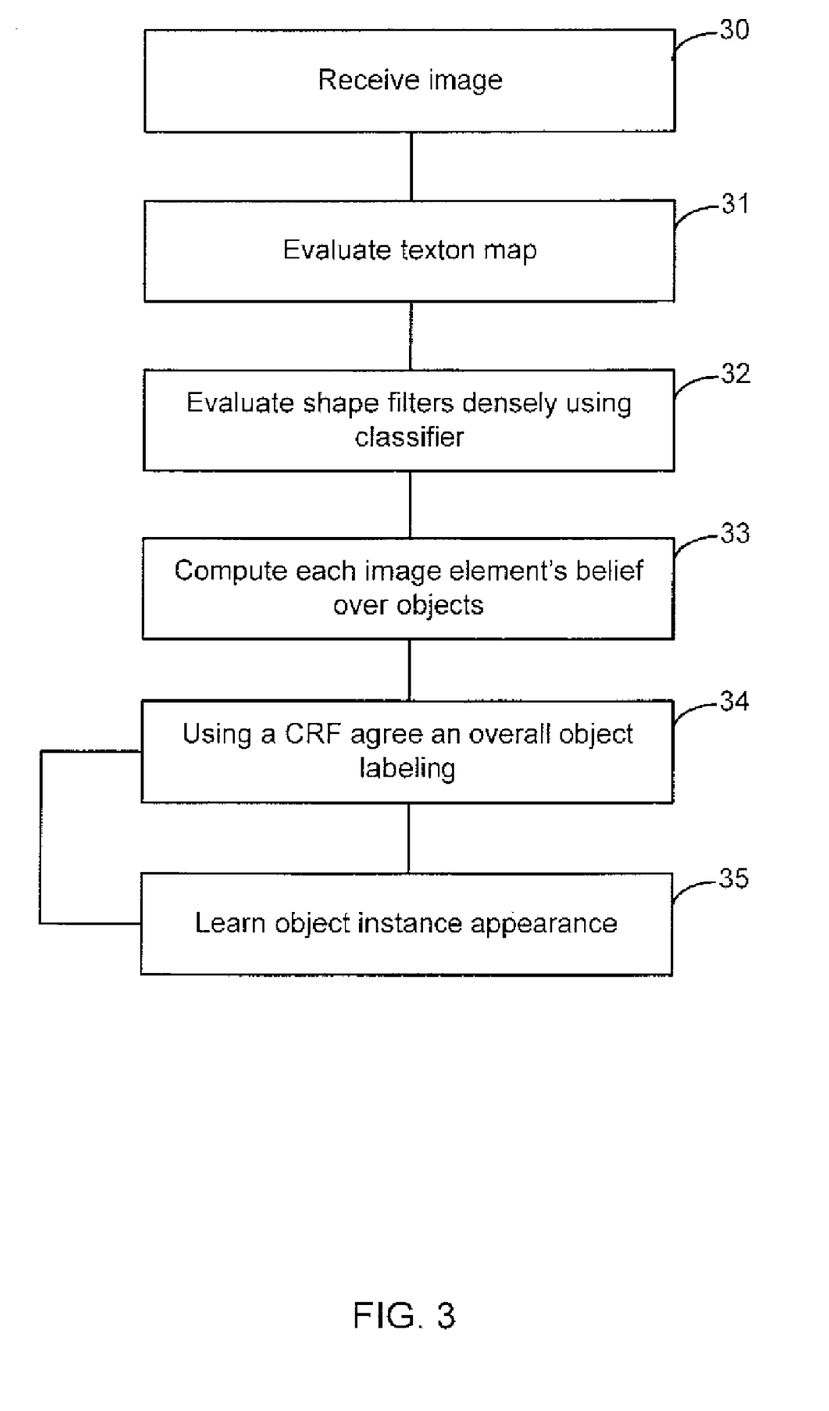
FIG. 3 is a flow diagram of a method of object detection and recognition.
Figure 5:
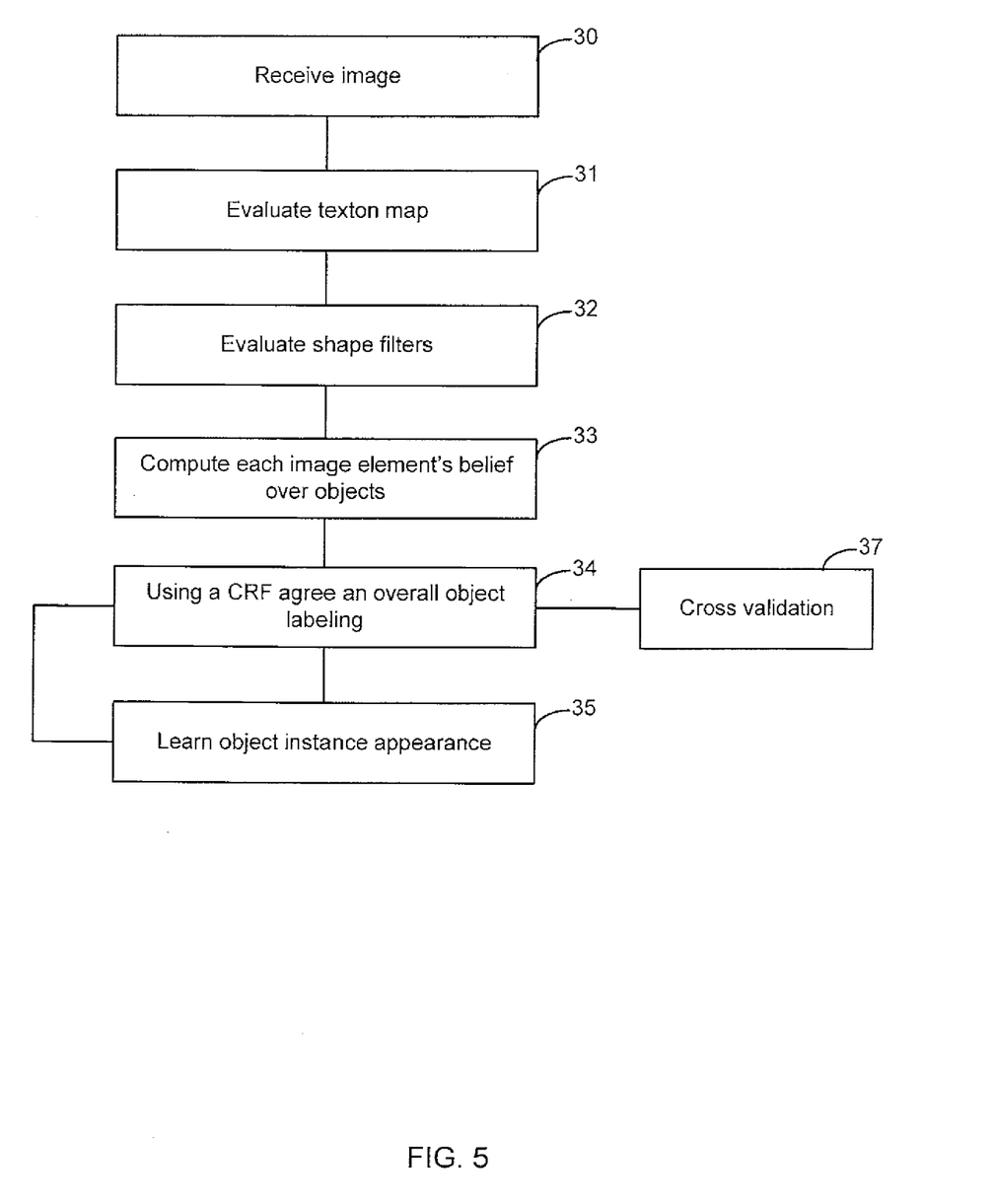
FIG. 5 is a flow diagram of the method of FIG. 3 with a cross-validation process.

FIG. 5 is the same as FIG. 3 but shows the cross validation process 37. During the cross validation process the parameters of the CRF model are optimized in order to produce optimal results on the training examples.

More detail about a particular example of a CRF model of object classes is now given, In this example, the use of a Conditional Random Field allows us to incorporate shape, texture, color, location and edge cues in a single unified model. We define the conditional probability of the class labels c given an image x as $$\log P(c|x, \theta) = \sum_i \underbrace{\psi_i(c_i, x; \theta_\psi)}_{\text{shape-texture}} + \underbrace{\pi(c_i, x_i; \theta_\pi)}_{\text{color}} + \underbrace{\lambda(c_i, i; \theta_\lambda)}_{\text{location}} + \sum_{(i,j) \in \varepsilon} \underbrace{\phi(c_i, c_j, g_{ij}(x); \theta_\phi)}_{\text{edge}} - \log Z(\theta, x) \quad (1)$$

where $\varepsilon$ is the set of edges in the 4-connected grid, $Z(\theta,x)$ is the partition function, $\theta = \{\theta_\psi, \theta_\pi, \theta_{80}, \theta_\phi\}$ are the model parameters, and i and j index nodes in the grid (corresponding to positions in the image).

Shape texture potentials. The shape-texture potentials $\psi$ use features selected by boosting to represent shape, texture and appearance context of the object classes. These features and the boosting procedure used to perform feature selection while training a multi-class logistic classifier are described below. We use this classifier directly as a potential in the CRF, so that $$\psi_i(c_i, X; \theta_\psi) = \log \tilde{P}_i(c_i|x) \quad (2)$$

where $\tilde{P}_i(c_i|x)$ is the normalized distribution given by the classifier using learned parameters $\theta_\psi$.

Edge potentials. Pair-wise edge potentials $\phi$ have the form of a contrast sensitive Potts model as described in Boykov, Y., Jolly, M. P.: "Interactive graph cuts for optimal boundary and region segmentation of objects in n-d images" Proc of IEEE ICCV (2001), $$\phi(c_i, c_j, g_{ij}(x); \theta_\phi) = -\theta_\phi^T g_{ij}(x) \delta(c_i \neq c_j) \quad (3)$$

In this example, we set the edge feature $g_{ij}$ to measure the difference in color between neighboring pixels, $g_{ij} = [\exp(-\beta \|x_i - x_j\|^2)1]^T$ where $x_i$ and $x_j$ are three-dimensional vectors representing the color of the ith and jth pixels. Including the unit element allows a bias to be learned, to remove small, isolated regions. The quantity $\beta$ is set (separately for each image) to $(2 \langle \|x_i - x_j\|^2 \rangle)^{-1}$, where $\langle . \rangle$ averages over the image.

Color potentials capture the color distribution of the instances of a class in a particular image. This choice is motivated by the fact that, whilst the distribution of color across an entire class of objects is broad, the color distribution across one or a few instances of the class is typically compact. Hence the parameters $\theta_\pi$ are learned separately for each image (and so this learning step needs to be carried out at test time). This aspect of the model captures the more precise image-specific appearance that a solely class-specific recognition system cannot.

Color models are represented as mixtures of Gaussians (GMM) in color space where the mixture coefficients depend on the class label. The conditional probability of the color of a pixel x is given by $$P(x|c) = \sum_k P(k|c) \mathcal{N}\left(x | T_k, \sum_k\right) \quad (4)$$

where k is a random variable representing the component the pixel is assigned to, and $\bar{x}_k$ and $$\sum_k$$

are the mixture mean and variance respectively. Notice that the mixture components are shared between different classes and only the coefficients depend on the class label, making the model much more efficient to learn than a separate GMM for each class. For a particular pixel xi we compute a fixed soft assignment to the mixture components $P(k|x_i)$. However, hard assignments may also be used. Given this assignment, we choose our color potential to have the form $$\pi(c_i, x_i; \theta_\pi) = \log \sum_k \theta_\pi(c_i, k) P(k|x_i) \quad (5)$$

where parameters $\theta_\pi$ act as a probability lookup-table.

Location potentials capture the weak dependence of the class label on the absolute location of the pixel in the image. The potential takes the form of a look-up table with an entry for each class and pixel location, $$\lambda_i(c_i, i; \theta_\lambda) = \log \theta_\lambda(c_i, \hat{i}). \quad (6)$$

The index $\hat{i}$ is the normalized version of the pixel index i, where the normalization allows for images of different sizes; e.g. if the image is mapped onto a canonical square then $\hat{i}$ indicates the pixel position within this canonical square.

Learning the CRF Parameters

In one example, we use a method based on piecewise training. Piecewise training involves dividing the CRF model into pieces, each of which is trained independently. Piecewise training is known in the art. For example, as described in Sutton, C., McCallum, A.: "Piecewise training of undirected models", In: 21$^{st}$ conference on Uncertainty in Artificial Intelligence, (2005). This training method minimizes an upper bound on the log partition function. However, this bound is generally an extremely loose one and performing parameter training in this way led to problems with over counting during inference in the combined model. We therefore modified piecewise training to incorporate fixed powers in order to compensate for over counting.

In an example, each of the potential types is trained separately to produce a normalized model. For the shape-texture potentials, we simply use the parameters learned during boosting. For the location potentials, we train the parameters by maximizing the likelihood of the normalized model containing just that potential and raising the result to a fixed power to compensate for over counting. Hence, the location parameters are learned using $$\theta_\lambda(c_i, \hat{i}) = \left(\frac{N_{c,\hat{i}} + \alpha_\lambda}{N_{\hat{i}} + \alpha_\lambda}\right)^{w_\lambda} \quad (7)$$

where $N_{c,\hat{i}}$ is the number of pixels of class c at normalized location $\hat{i}$ in the training set, $N_{\hat{i}}$ is the total number of pixels at location $\hat{i}$ and $\alpha_\lambda$ is a small integer (we use $\alpha_\lambda = 1$) corresponding to a weak Dirichlet prior on $\theta_\lambda$.

At test time the color parameters are learned for each image in a piecewise fashion using Iterative Conditional Modes. First a class labeling c* is inferred and then the color parameters are updated using $$\theta_\pi(c_i, k) = \left(\frac{\sum_i \delta(c_i = c_i^*) P(k|x_i) + \alpha_\pi}{\sum_i P(k|x_i) + \alpha_\pi}\right)^{w_\pi}. \quad (8)$$

Given this new parameter setting, a new class labeling is inferred and this procedure is iterated. The Dirichlet prior parameter $\alpha_{90}$ was set to 0.1, and the power parameter is $w_\pi$. In one example, $w_{90} = 3$, fifteen color components and two iterations of this procedure gave good results. However, other power parameter values, numbers of color components and numbers of iterations can be used. Because we are training in pieces, the color parameters do not need to be learned for the training set.

The edge potential parameters $\theta_\phi$ may be learnt by maximum likelihood, specified manually, or determined in any other suitable way.

More detail about an example inference process (box 3b, FIG. 3) is now given.

Given a set of parameters learned for the CRF model, we wish to find the most probable labeling c*; i.e. the labeling that maximizes the conditional probability (1). In one example, the optimal labeling is found by applying the alpha-expansion graph-cut algorithm mentioned above (note that our energy is regular). In this example the initial configuration is given by the mode of the unary potentials.

More detail about textons and shape filters in a particular example are now given.

Textons. Efficiency demands compact representations for the range of different appearances of an object. For this we utilize textons. In an example, a dictionary of textons is learned by convolving a 17-dimensional filter bank with all the training images and running K-means clustering (using Mahalanobis distance) on the filter responses. Finally, each pixel in each image is assigned to the nearest cluster center, thus providing a texton map.

In an example, shape filters consist of a set of $N_R$ rectangular regions whose four corners are chosen at random within a fixed bounding box covering about half the image area. For a particular texton t, the feature response at location i is the count of instances of that texton under the offset rectangle mask. These filter responses can be efficiently computed over a whole image with integral images as described in Viola, P., Jones, M.: "Rapid object detection using a boosted cascade of simple features", in: CVPR01, (2001), 1:511-518 (K for each image, where K is the number of textons).

Joint Boosting for unary classification. In an example, a multi-class classifier is learned using an adapted version of the Joint Boosting algorithm mentioned above. The algorithm iteratively builds a strong classifier as a sum of 'weak classifiers', simultaneously selecting discriminative features. Each weak classifier is a decision stump based on a thresholded feature response, and is shared between a set of classes, allowing a single feature to help classify several classes at once. The sharing of features between classes allows for classification with cost sub-linear in the number of classes, and also leads to improved generalization.

The learned 'strong' classifier is an additive model of the form $$H(c_i) = \sum_{m=1}^{M} h_m(c_i),$$

summing the classification confidence of M weak classifiers. This confidence value can be reinterpreted as a probability distribution over $c_i$ using the softmax transformation $$\tilde{P}_i(c_i|x) = \frac{\exp(H(c_i))}{\sum_{c_i'} \cdot \exp(H(c_i'))}.$$

Each weak-learner is a decision stump of the form $$h(c_i) = \begin{cases} a\delta(v(i, r, t) > \theta) + b & \text{if } c_i \in N \\ k_{c_i} & \text{otherwise} \end{cases} \quad (9)$$

with parameters $(a, b, \{k_c\}_{c \in N}, \theta, N, r, t)$ and where $\delta(.)$ is a 0-1 indicator function. The r and t indices together specify the shape filter feature (rectangle mask and texton respectively), with $v(i,r,t)$ representing the corresponding feature response at position i. For those classes that share this feature ($c_i \in N$), the weak learner gives $h(c_i) \in \{a+b, b\}$ depending on the comparison of $v(i,r,t)$ to a threshold $\theta$. For each class not sharing the feature ($c_i \in N$) there is a constant $k_{c_i}$ that ensures asymmetrical sets of positive and negative training examples do not adversely affect the learning procedure.

The boosting algorithm iteratively minimizes an error function which unfortunately requires an expensive brute-force search over the sharing set N, the features (r and t), and the thresholds $\theta$. Given these parameters, a closed form solution exists for a, b and $\{k_c\}_{c \in N}$. The set of all possible sharing sets is exponentially large, and so we employ a quadratic-cost greedy approximation as described in Torralba, A., Murphy, K., Freeman, W.: "Sharing Features: Efficient boosting procedures for multiclass object detection", Proc of IEEE CVPR (2004) 762-769. To speed up the minimization over features we employ the random feature selection procedure described below. Optimization over $\theta \in \Theta$ for a discrete set $\Theta$ can be made efficient by use of histograms of feature responses.

Sub-sampling and random feature selection for training efficiency. The considerable memory and processing requirements make training on a per-pixel basis impractical. Computational expense may be reduced by calculating filter responses on a $\Delta \times \Delta$ grid (for example either 3×3 for the smaller databases or 5×5 for the largest database). The shape filter responses themselves are calculated at full resolution to enable per-pixel accurate classification at test time.

Even with sub-sampling, exhaustive searching over all features (pairs of rectangle and texton) at each round of boosting is prohibitive. However, our algorithm examines only a fraction $\tau \ll 1$ of features, randomly chosen at each round. All our results use $\tau = 0.003$ so that, over several thousand rounds, there is high probability of testing all features at least once.

We found that using random feature selection improves the training time by several orders of magnitude whilst having only a small impact on the training error.

Figure 6:
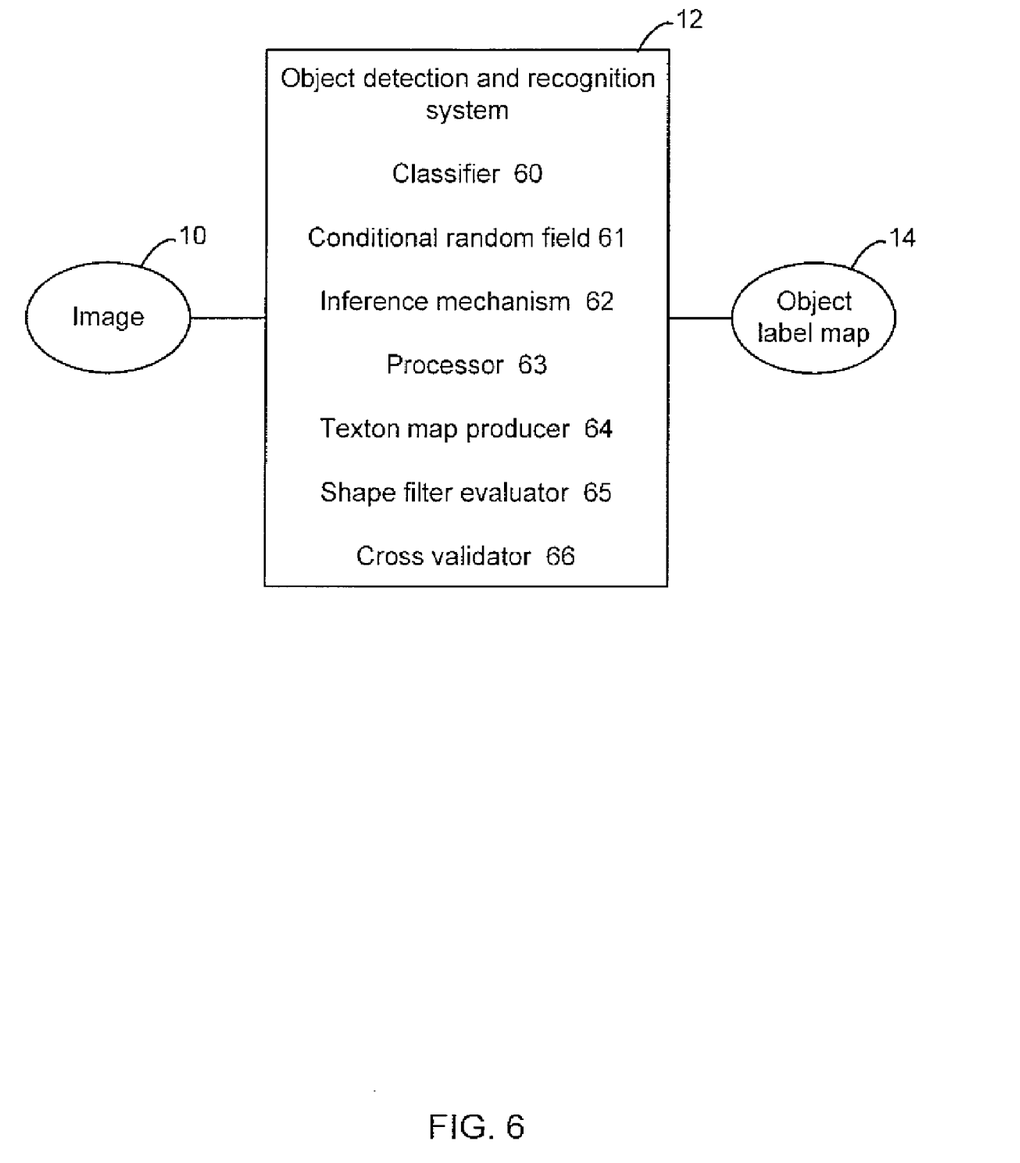
FIG. 6 is a schematic diagram of the object detection and recognition system of FIG. 1 in more detail.

FIG. 6 is a schematic diagram of an object detection and recognition system 12. It comprises an input arranged to receive images 10 and an output arranged to provide object label maps 14. The system is provided using any suitable processor 63 such as a computer as mentioned above with reference to FIG. 1. A classifier 60, which is a multi-class classifier is formed during a training process and a conditional random field model 61 is provided as described above. An inference mechanism 62 is used to infer an object label map using the conditional random field model. A texton map producer 64 forms texton maps by accessing a dictionary of textons which may be stored at a memory either integral with the system 12 or in communication with the system. A shape filter evaluator 65 applies shape filter and texton pairs to texton maps as described above and a cross validator 66 provides cross validation processes as described with reference to FIG. 5.

In an example an object detection and recognition system is provided comprising:

an input arranged to receive a plurality of training images of objects;

an input arranged to receive an object label map for each training image, each object label map comprising a label for each image element specifying one of a plurality of object classes;

means for accessing a dictionary of textons, each texton comprising information describing the texture of a patch of surface of an object;

a texton map producer arranged to form a texton map for each training image using the dictionary of textons, each texton map comprising, for each image element a label indicating a texton;

a shape filter evaluator arranged, for each texton map to compute a plurality of feature responses by applying a different shape filter for each feature response;

a processor arranged to select a sub-set of the shape filter, texton pairs used in computing the feature responses by forming a multi-class classifier to classify image elements into the object classes on the basis of at least some of the feature responses; and wherein the processor is also arranged to form an object label map for a previously unseen image using the selected shape filter, texton pairs.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given byway of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
receiving a plurality of training images of objects;
receiving an object label map for each training image, each object label map comprising a label for each image element specifying one of a plurality of object classes;
accessing a dictionary of textons, each texton comprising information describing the texture of a patch of surface of an object;
forming a texton map for each training image using the dictionary of textons, each texton map comprising, for each image element a label indicating a texton;
for each texton map computing a plurality of feature responses by applying a different shape filter for each feature response, each shape filter comprising a bounding area defining an area of an image within which the shape filter is applied, the bounding area being movable within the image and having an area comprising ¼ to ¾ of the image area;
selecting a sub-set of the shape filters used in computing the feature responses by forming a multi-class classifier to classify image elements into the object classes on the basis of at least some of the feature responses; and forming an object detection and recognition system using the selected shape filters.

2. A method as claimed in claim 1 wherein each shape filter further comprises a plurality of substantially randomly sized and positioned rectangular regions within that bounding area.

3. A method as claimed in claim 1 wherein the step of accessing the dictionary of textons comprises forming the dictionary of textons using the training images.

4. A method as claimed in claim 1 wherein the multi-class classifier is formed using a joint boosting process.

5. A method as claimed in claim 4 wherein the joint boosting process comprises iteratively building the multi-class classifier as a sum of decision stumps comprising thresholds applied to the feature responses, each decision stump being shared between a plurality of object classes.

6. A method as claimed in claim 1 wherein forming the object detection and recognition system comprises forming a conditional random field model of object classes that model comprising definitions of the conditional probability of object class labels given an image on the basis of a plurality of potentials comprising at least shape-texture potentials using the shape filter, texton pairs.

7. A method as claimed in claim 6 which further comprises learning parameters for the conditional random field model by dividing the model into pieces and training each piece independently using a training method incorporating fixed powers.

8. A method as claimed in claim 6 wherein the conditional random field model is also formed on the basis of color potentials arranged to represent the color distribution of the instances of an object class in a particular image.

9. A method as claimed in claim 6 wherein the conditional random field model is also formed on the basis of location potentials.

10. A method as claimed in claim 6 wherein the conditional random field model is also formed on the basis of edge potentials.

11. A method as claimed in claim 6 which further comprises using the conditional random field model to agree an overall object labeling for a previously unseen image and using an inference process to infer an object label map from the agreed overall object labeling.

12. A method comprising:
receiving a plurality of training images of objects;
receiving an object label map for each training image, each object label map comprising a label for each image element specifying one of a plurality of object classes;
accessing a dictionary of textons, each texton comprising information describing the texture of a patch of surface of an object;
forming a texton map for each training image using the dictionary of textons, each texton map comprising, for each image element a label indicating a texton;
for each texton map computing a plurality of feature responses by applying a different shape filter for each feature response;
selecting a sub-set of the shape filters used in computing the feature responses by forming a multi-class classifier to classify image elements into the object classes on the basis of at least some of the feature responses, the multi-class classifier being formed using a joint boosting process, the joint boosting process comprising iteratively building the multi-class classifier as a sum of decision stumps comprising thresholds applied to the feature responses, each decision stump being shared between a plurality of object classes; and forming an object label map for a previously unseen image using the selected shape filters.

13. A method as claimed in claim 12 wherein forming the object label map for a previously unseen image comprises forming a conditional random field model having shape-texture potentials, edge potentials, color potentials and location potentials.

14. A method as claimed in claim 13 which further comprises learning parameters for the shape-texture potentials using a joint boosting process with substantially random selection of shape filters.

15. A method as claimed in claim 13 which further comprises learning parameters for the color potentials using an iterative conditional mode method.

16. One or more computer readable storage, which the storage media is not a signal, media having computer executable instructions for performing acts comprising:
receiving a plurality of training images of objects;
receiving an object label map for each training image, each object label map comprising a label for each image element specifying one of a plurality of object classes;
accessing a dictionary of textons, each texton comprising information describing the texture of a patch of surface of an object;
forming a texton map for each training image using the dictionary of textons, each texton map comprising, for each image element a label indicating a texton;
for each texton map computing a plurality of feature responses by applying a different shape filter and texton pair for each feature response, each shape filter comprising a bounding area defining an area of an image within which the shape filter is applied, the bounding area being movable within the image and having an area comprising ¼ to ¾ of the image area;
selecting a sub-set of the shape filters used in computing the feature responses by forming a multi-class classifier to classify image elements into the object classes on the basis of at least some of the feature responses; and
forming an object label map for a previously unseen image using the selected shape filters.

17. The computer readable media of claim 16 wherein the computer executable instructions are arranged to apply the shape filters such that the subset comprises about ½ the image area.

18. The computer readable media of claim 16 wherein the computer executable instructions are arranged to apply the shape filters such that each shape filter comprises a plurality of substantially randomly sized and positioned rectangular regions within that bounding area.

19. One or more computer-readable storage media which the storage media is not a signal, having computer executable instructions for performing acts comprising:
receiving a plurality of training images of objects;
receiving an object label map for each training image, each object label map comprising a label for each image element specifying one of a plurality of object classes;
accessing a dictionary of textons, each texton comprising information describing the texture of a patch of surface of an object;
forming a texton map for each training image using the dictionary of textons, each texton map comprising, for each image element a label indicating a texton;
for each texton map computing a plurality of feature responses by applying a different shape filter for each feature response, each shape filter comprising a bounding area defining an area of an image within which the shape filter is applied, the bounding area being movable within the image and having an area about ¼ to ¾ of the image area;
selecting a sub-set of the shape filters used in computing the feature responses by forming a multi-class classifier to classify image elements into the object classes on the basis of at least some of the feature responses; and
forming an object detection and recognition system using the selected shape filters.

20. A method comprising:
receiving a plurality of training images of objects;
receiving an object label map for each training image, each object label map comprising a label for each image element specifying one of a plurality of object classes;
accessing a dictionary of textons, each texton comprising information describing the texture of a patch of surface of an object;
forming a texton map for each training image using the dictionary of textons, each texton map comprising, for each image element a label indicating a texton;
for each texton map computing a plurality of feature responses by applying a different shape filter for each feature response, each shape filter comprising a bounding area defining an area of an image within which the shape filter is applied, the bounding area being movable within the image and having an area comprising a subset of the image area;
selecting a sub-set of the shape filters used in computing the feature responses by forming a multi-class classifier to classify image elements into the object classes on the basis of at least some of the feature responses, wherein the multi-class classifier is formed using a joint boosting process, and wherein the joint boosting process comprises iteratively building the multi-class classifier as a sum of decision stumps comprising thresholds applied to the feature responses, each decision stump being shared between a plurality of object classes; and
forming an object detection and recognition system using the selected shape filters.

21. A method as claimed in claim 20, wherein forming the object detection and recognition system comprises forming a conditional random field model of object classes that model comprising definitions of the conditional probability of object class labels given an image on the basis of a plurality of potentials comprising at least shape-texture potentials using the shape filter, texton pairs.

* * * * *